United States Patent [19]

Chau et al.

[11] Patent Number: 4,775,474

[45] Date of Patent: Oct. 4, 1988

[54] MEMBRANES CONTAINING MICROPOROUS STRUCTURE

[75] Inventors: Chieh-Chun Chau; Charles E. Reineke; Lu H. Tung, all of Midland, Mich.; Edward J. Kramer, Ithaca, N.Y.

[73] Assignee: The Dow Chemical Company, Midland, Mich.

[21] Appl. No.: 936,547

[22] Filed: Dec. 1, 1986

Related U.S. Application Data

[63] Continuation-in-part of Ser. No. 684,648, Dec. 21, 1984, abandoned, and a continuation-in-part of Ser. No. 693,413, Jan. 22, 1985, abandoned, and a continuation-in-part of Ser. No. 693,414, Jan. 22, 1985, abandoned.

[51] Int. Cl.$^4$ ............................................. B01D 13/00
[52] U.S. Cl. ................... 210/500.34; 55/16; 55/158; 210/500.43; 264/22
[58] Field of Search ................. 521/62, 88, 139, 140; 264/22, 342 R, 343; 210/500.27, 500.34, 500.35, 500.41, 500.43; 55/16, 158

[56] References Cited

U.S. PATENT DOCUMENTS

| | | | |
|---|---|---|---|
| 3,062,905 | 11/1962 | Jennings et al. | 55/16 X |
| 3,083,118 | 3/1963 | Bridgeford | 162/157.7 X |
| 3,750,735 | 8/1973 | Chiang et al. | 159/DIG. 27 X |
| 4,115,303 | 9/1978 | Marchand et al. | 521/53 |
| 4,230,463 | 10/1980 | Henis et al. | 55/71 X |
| 4,468,502 | 8/1984 | Malon et al. | 55/16 X |
| 4,486,376 | 12/1984 | Makino et al. | 264/342 R |
| 4,595,707 | 6/1986 | McCreedy et al. | 521/62 |

*Primary Examiner*—Frank Spear

[57] ABSTRACT

Asymmetric membranes are prepared by treating a major surface of a glassy polymer composition to render the surface resistant to solvent crazing and then contacting the glassy polymer composition with a crazing solvent. The crazing solvent permanently deforms the glassy polymer composition by forming a microporous structure on the untreated surface. The treated surface becomes the dense, discriminating layer of the membrane which achieves desirable permeation selectivity. The methods of treatment are (1) crosslinking, (2) providing an agent which renders the surface resistant to crazing, and (3) providing an agent which reacts with the surface. Additionally, the glassy polymer composition can be crosslinked before or after it is crazed to increase the mechanical strength of the membrane.

26 Claims, No Drawings

MEMBRANES CONTAINING MICROPOROUS STRUCTURE

CROSS-REFERENCE TO RELATED APPLICATIONS

This is a continuation-in-part of U.S. patent application Ser. No. 684,648, filed Dec. 21, 1984; U.S. patent application Ser. No. 693,413, filed Jan. 22, 1985; and U.S. patent application Ser. No. 693,414, filed Jan. 22, 1985; all now abandoned.

BACKGROUND OF THE INVENTION

The present invention relates to membrane compositions for the separation of components from fluid mixtures or solutions, and in particular to methods for preparing such membranes.

Separation processes such as dialysis, ultrafiltration, and reverse osmosis have been used in the separation of a wide variety of impurities and components from solutions. Membranes have been developed and used, for example, in the desalination of brackish and saline waters. Membranes have also been developed for the separation of gases. Membranes have been used for the separation of acid gases from methane, as described in U.S. Pat. Nos. 3,534,528; 4,130,403 and 4,561,654, or the separation of other gas mixtures as described in U.S. Pat. No. 4,230,463.

The properties of membranes can generally be defined in terms of permeation selectivity for specific components to be separated, permeation flux for one of the components to be separated, and mechanical strength of the membrane composition. The permeation flux is a measure of the rate at which one of the components to be separated permeates through the membrane. Permeation selectivity is an indication of the ratio of the permeation fluxes of the components to be separated, often referred to as the separation factor. Permeation flux is generally inversely proportional to the thickness of the discriminating layer. Advantageously, the discriminating layer is as thin as possible. Unfortunately, extremely thin membrane structures are typically fragile, have poor mechanical strengths and frequently contain discontinuities, small holes or other defects.

Known membrane compositions include cellulose ester membranes, which are typically employed in flat sheet or hollow fiber form. The so-called Loeb-Sourirajan method for preparing such membranes involves providing a microporous structure for support and a dense layer for separation. This method produces asymmetric membranes which possess good physical strength and membrane characteristics. Unfortunately, the method involves process limitations which are difficult to control and, as noted in U.S. Pat. No. 4,430,807, can require special drying techniques if used for gas separation.

Numerous attempts have been made to improve both the membrane compositions and the processes for their preparation. For example, Henis et al., *Science*, Vol. 220, pg. 11 (1983) disclose a gas separation membrane composition which comprises a coating of silicone rubber in an attempt to plug flaws and defects present in the membrane. Unfortunately, such membrane compositions normally exhibit permeation selectivities intermediate between the silicone rubber and the remainder of the membrane. Delamination of the coating can also occur under certain operating conditions.

Attempts to provide solvent crazed polystyrene microporous membranes by Michaels et al., *Advances in Polymer Science*, Vol. 27 (1978) have proved unsuccessful. In particular, such membranes exhibit a small increase in flux and are too weak for practical uses.

In view of the deficiencies of the art, it would be highly desirable to provide a membrane composition and a process for preparing same, which membrane composition exhibits good permeation flux and selectivity, good mechanical strength, and which can be prepared in an efficient and cost-effective manner.

SUMMARY OF THE INVENTION

The present invention is a process for preparing an asymmetric membrane having at least one dense layer, comprising the steps of treating a surface of a nonporous, glassy polymer composition to render the surface resistant to solvent crazing; and then contacting the glassy polymer composition with a solvent to craze the composition and thereby provide at least one microporous layer and leave at least one dense layer.

The present invention, in another aspect, is an asymmetric membrane made from the glassy polymel composition by the process described above, which comprises at least one dense layer at a first major surface of the membrane and at least one microporous layer at a second major surface of the membrane.

The process of this invention provides the skilled artisan with a method for making membrane compositions which are useful in a wide variety of applications. For example, the membrane compositions of this invention are useful for gas separations, liquid separations, ultrafiltration processes, reverse osmosis and as substrates for composite membranes.

The membrane compositions in preferred embodiments of this invention can be highly permeation selective, exhibit a desirable high permeation flux, and exhibit good physical strengths. Said compositions are prepared under controllable conditions and contain few defects and discontinuities in the dense layer.

DETAILED DESCRIPTION OF THE INVENTION

The physical structure of a polymer can range from one that is almost completely crystalline or semi-crystalline to one that is completely amorphous. The characteristics of an amorphous polymer will vary dependent upon whether the polymer is at a temperature above or below its glass transition temperature, $T_g$. At temperatures above $T_g$, the polymer is soft and rubbery. At temperatures below $T_g$, the polymer is hard and brittle.

A glassy polymer, as the term is used herein, is either completely amorphous or has an amorphous matrix with a minor degree of crystallinity. A glassy polymer exists below its $T_g$ and therefore exhibits certain properties characteristic of those of a glass. As the term is used herein, the glassy polymer is normally a dense, homogeneous material that is nonporous.

A glassy polymer composition is a glassy polymer or a mixture comprising a continuous glassy polymer phase with a finely divided rubbery phase. A glassy polymer composition can be crazed in the same manner as a glassy polymer. Examples of glassy polymer compositions include polystyrene, poly(p-methylstyrene), poly(t-butyl styrene), poly-2-methylpropene, polyvinylchloride, polymethylmethacrylate, styrene acrylonitrile copolymers, styrene butadiene copolymers, acrylonitrile styrene butadiene terpolymers (ABS resins), styrene acrylic acid copolymers, styrene isoprene block copolymers, styrene butadiene block copolymers, polysulfones, polyester sulfones, blends of polystyrene and poly(2,6-dimethylphenylene oxide), blends of the foregoing polymers, and the like. Such polymers are desirable because such types of glassy polymer compositions are selective for separation of gases.

Glassy polymer compositions can be employed in any of the conventional forms which provide a surface suitable for permselective applications. For example, the glassy polymer compositions can be employed in the form of flat sheets or films (i.e., self supporting films), hollow fibers or tubular structures. A film or sheet can be prepared via a variety of conventional techniques, including extrusion of an oriented layer or compression molding a layer of low orientation. Glassy polymer compositions in the form of oriented films are preferred.

The process for preparing an asymmetric membrane from a glassy polymer composition requires that a surface of the polymer composition be treated to render the surface resistant to solvent crazing. The surface to be treated is the surface that will form the dense layer at a first major surface of the asymmetric membrane. Desirably, this dense layer is the one that contacts the feed stream when the membrane is disposed in a membrane device. A microporous layer is created in and beneath a second major surface of the membrane when the glassy polymer composition is crazed. This second surface is normally the one that contacts the permeate stream, i.e., the fluid which permeates through the membrane. For example, when the glassy polymer composition is employed as a flat sheet or film, the first and second major surfaces are the two planar surfaces. When the glassy polymer composition is employed as a hollow fiber, the first major surface may be the exterior longitudinal surface, where longitudinal refers to a direction parallel to the axis of the lumen, and the second major surface may be the surface of the lumen. Alternatively, the first and second surfaces of the hollow fiber can be reversed.

The dimensions of the glassy polymer compositions employed in the process of this invention are preferably those that will provide membrane compositions with conventional dense layers. Most preferably, it is desirable that the dense layer of the membrane composition be a continuous layer having as few discontinuities or defects as possible. For example, dense layers having thicknesses in the range from about 0.1 $\mu$m or less to about 25 $\mu$m are generally preferred, depending upon the glassy polymer composition which is employed. Thus, glassy polymer compositions which are thick enough to provide a dense layer of the desired integrity (i.e., sufficiently thick to be essentially free of holes or defects through the layer) and, also provide sufficiently thick microporous domain(s) for support and physical strength are desirable. Glassy polymer compositions having total thicknesses ranging from 5 $\mu$m to about 100 $\mu$m are typically employed. Typically, the thickness of the dense layer ranges up to about 50 percent of the total thickness of the untreated polymer composition (i.e., the original thickness of the glassy polymer composition prior to crazing).

In one preferred embodiment of the invention, the glassy polymer composition is crosslinked to a depth and degree effective to provide an increase in physical strength to the membrane composition while not substantially limiting the permeation flux of the membrane composition. The degree of crosslinking which provides an increase in physical strength can vary over a considerable range. Preferably, the glassy polymer composition is crosslinked to a degree necessary to provide at least a five percent increase in tensile strength over the tensile strength of the untreated glassy polymer composition. The crosslink density can vary in the composition with thickness. For example, the crosslink density can be essentially constant throughout the thickness of the composition. Conversely, the crosslink density can be relatively high in proximity to one surface of the composition while the composition near the opposite surface is not crosslinked. The gradient of crosslink density can range from gradual to precipitous.

The glassy polymer composition can be crosslinked by a variety of techniques known in the art. For example, the polymer composition can be irradiated using, for example, UV radiation or electron beam radiation. Radiation sensitive polymers can be modified with various components and subjected to low amounts of radiation in order to provide crosslinking (for example, dimethylmaleimide modified polystyrene can be coextruded with polystyrene and subjected to UV radiation). Crosslinks can be provided by chemical reaction of groups attached to the polymer backbone. For example, groups bearing an active hydrogen atom, such as hydroxyl or primary or secondary amine moieties, can be crosslinked with a compound bearing an average of at least two isocyanate or acyl halide moieties.

A convenient means for crosslinking the glassy polymer composition involves providing a sample of a glassy polymer composition on a conveyor means which conveys the sample at a selected speed in the path of an electron beam. Preferably, at least one surface of the glassy polymer composition is substantially uniformly irradiated. The depth of penetration of radiation into the sample, the dose rate of radiation and the total irradiated dosage can be controlled by varying the voltage of the electron beam, the beam current, and the line speed of the conveyor. Preferably, the dosage provided to increase the physical strength of the membrane composition ranges from 10 to 50 megarads (Mrads), more preferably from 20 to 50 Mrads.

Crosslinking generally decreases the rate of crazing of the glassy polymer composition. By controlling the crosslinking such that the crosslink density is greater in proximity to one surface of the glassy polymer composition, it is possible to render that surface substantially resistant to crazing such that a dense layer is produced on the surface with the highest crosslink density and the remainder of the composition is microporous. In effect, an asymetric membrane can be formed. There are various methods to control the crosslink density through the glassy polymer composition, including controlling the radiation dosage across the thickness of the film. Preferably, the dosage provided to one surface of the glassy polymer composition to render that surface substantially resistant to crazing ranges from 40 to 150 Mrads, more preferably from 60 to 80 Mrads. In a preferred embodiment, the glassy polymer composition is covered with a second layer of a polymeric material prior to crosslinking in order to provide a sharp gradient of the irradiated dosage across the depth of the glassy polymer composition. The type and thickness of the second layer of polymeric material depends upon factors such as the depth of penetration of radiation from the electron beam processor into the glassy polymer composition. Without the crosslinking treatment of the glassy polymer composition or with substantially equal crosslinking treatment on each surface of the glassy polymer composition, the dense layer will typically be located near the center of the membrane composition. In general, it is desirable that the discriminating layer be located on or near one major surface of the membrane.

In another embodiment of the invention, an asymmetric membrane can be prepared by treating the surface of the glassy polymer composition with an agent which at least substantially inhibits crazing of the protected surface of the glassy polymer composition. The agent can be a material or blend of materials which can prevent or substantially retard the amount or rate of crazing for the specific glassy polymer composition. For example, the agent can: (1) prevent the crazing solvent from directly contacting the surface of the glassy polymer composition and can be readily removed from the composition after the desired crazing of the composition has occurred, (2) exhibit a high transmission rate for the components permeating the membrane, yet be capable of protecting the membrane from attack by the crazing solvent, or (3) diffuse into the glassy polymer composition to a limited depth to render the surface layer resistant to solvent crazing.

The process for treating the composition with the agent which inhibits crazing of one surface of the glassy polymer composition can vary. For example, the agent can be applied by conventional techniques such as coating, dipping, spraying, plasma coating, and coextrusion. It is possible to apply the agent using a pressurized flow technique. For example, when the polymer composition is configured as a hollow fiber, coating solution can be pumped through the fiber bore. Different agents and methods of application may be more or less effective in inhibiting crazing dependent upon the identity of glassy polymer composition and/or crazing solvent employed. Suitable compositions and solvents can be readily selected empirically or by reference to standard works on crazing.

An agent which prevents the crazing solvent from directly contacting the glassy polymer composition can include, for example, numerous water-soluble or water-dispersible polymers which are not as susceptible as the glassy polymer composition to crazing by a particular solvent. Examples of these agents include polyacrylic acid, polymethacrylic acid, polyacrylamide, vinyl addition polymers bearing alkali metal acrylate groups, methylcellulose, polyvinylalcohol, and the like. The agent is conveniently applied to the surface by coating, when the agent is dispersed or dissolved in a suitable solvent. The agent can be applied as a coating having a thickness which is adequate to substantially prevent the crazing solvent from coming into contact with the glassy polymer composition during the crazing process. Advantageously, the thickness of the coating will range from about 1 μm to about 50 μm. It is preferred that the agent be removed without damage to the membrane, after the desired crazing is accomplished. For example, a water-soluble or water-dispersible agent can be removed by contacting the membrane composition with an aqueous liquid.

An agent which exhibits a high transmission rate for permeating components, yet protects the membrane from attack by the crazing fluid, includes, for example, various rubbery polymers. Examples of such polymers include polybutadiene, polyisoprene, the polysiloxanes, ethylene-propylene copolymers, polychloroprene, and the like. If desired, the agent can be crosslinked using a suitable conventional vulcanization process. The thickness of the coating can vary. Preferably, the thickness of the coating is in the range from about 1 μm to about 20 μm.

An agent which is capable of diffusing into the glassy polymer composition to a limited depth to render the surface layer resistant to solvent crazing can include, for example, reactive crosslinking agents. Examples of such materials are divinyl benzene, ethylene dimethacrylate, epoxy resins, and the like. Such polyfunctional materials which have diffused into the glassy polymer composition can be processed in order to provide a crosslinked network. Crosslinking can be promoted by various techniques, such as thermal, electron beam or UV radiation cure. Of course, the glassy polymer desirably bears groups reactive with the cross-linking agent.

We can also treat one surface of the glassy polymer composition with an agent which reacts with groups on the surface and imparts a polar character to the surface. The chemically modified surface generally has a high resistance to crazing caused by crazing solvents. For example, it is desirable to employ essentially non-polar crazing solvents when the surface region of the glassy polymer composition has a relatively polar character. The properties of such a chemically modified surface can be altered depending upon the agent which is employed, the degree of treatment of the surface with the agent, etc. Thus, it is possible to alter properties of the dense layer, such as thickness, depending upon the type of treatment of the polymer substrate with the agent. In addition, a strict control of time and temperature during the crazing process is not generally required. The high resistance to crazing which is present in the chemically modified surface allows for the preparation of the dense layer which is less likely to contain undesirable flaws such as holes, etc.

Agents which provide polar characteristics to the surface of the glassy polymer are generally known. Examples of suitable agents include those which sulfonate, halogenate, carboxylate, phosphonate, or aminate the surface. For example, a glassy polymer surface can be treated with sulfur trioxide, bromine, concentrated sulfuric acid, fluorine, an oxidative plasma or ammonia.

A variety of techniques can be used to apply the agent to the surface of the polymer substrate. Coating techniques for fluids described hereinbefore are convenient. Typically, if the agent is one which is gaseous in nature, the agent can be employed in liquid form using a suitable liquid carrier in which the gaseous agent can be dissolved. Suitable carrier liquids include water, liquified perfluorocarbon gases, highly volatile perfluorocarbon liquids, etc.

The time period during which the surface is treated with the agent will depend upon factors such as the concentration of the agent, the composition of the polymer substrate, temperature during treatment, and the like.

The glassy polymer composition which can be crosslinked to provide increased physical strength to the membrane composition is subjected to crazing. "Crazing" is the application of a stress on a glassy polymer composition that permanently deforms the composition by forming micropores. The applied stress can be mechanical, thermal, or the action of an organic solvent. The formation of micropores, frequently termed "crazes" is generally a phenomenon observed in glassy polymer compositions. If a sufficient stress is applied to a glassy polymer composition to fracture the polymer, the fracture is usually preceded by a craze.

The process of this invention uses an organic solvent to craze the glassy polymer composition. The proper solvent must be capable of diffusing into the polymer without completely dispersing or dissolving the polymer. Typically, the solubility parameters of the solvent and polymer must be such that contact with the solvent will cause the polymer to swell. The choice of solvent and optional co-solvents and the required concentration and other parameters will depend on the polymer composition, its orientation, and the temperature at which the solvent is applied. These parameters can be readily selected by empirical evaluation.

Solvent crazing in this application creates a microporous structure from a nonporous glassy polmyer composition when the polymer is contacted with an appropriate solvent. The microporous structure will provide a membrane composition that exhibits good permeation flux. Good permeation flux is defined herein as at least a twofold increase in the permeation rate of desired components through the membrane over the rate achieved by an untreated glassy polymer composition. Preferably, the permeation flux is at least a fourfold increase over the rate achieved by an untreated composition. Examples of crazing solvents that create the microporous structure include aliphatic hydrocarbons, including hexane and heptane; the halocarbons, including dichloromethane; the aliphatic ethers including methyl ethyl ether; and the carbonyl-containing solvents such as acetone and methyl ethyl ketone; aprotic polar solvents such as dimethylsulfoxide; and the like. Combinations of solvents can be employed. Alternatively, vapors of the crazing solvent can be employed to achieve the desired crazing. See, E. J. Kramer, *Developments in Polymer Fracture I*, ed. by E. H. Andrews, published by Applied Science Publishers, Inc., (1979); which is incorporated herein by reference. Advantageously, lthe pore dimension of the microporous layer formed by the crazing ranges from less than about 1 μm to about 100 μm, more preferably 1 μm to about 50 μm.

The crazing solvent can be removed from the membrane composition using conventional techniques. The polymer composition is conveniently removed from the solvent in which it is immersed and drained or wiped. Desirably, the residual crazing solvent is evaporated under reduced pressure.

If desired, the membrane composition can be subjected to a further crosslinking after the crazing solvent has been removed. This can be readily accomplished by subjecting the composition to a suitable dosage of irradiation. Typically, it is desirable to subject the composition to irradiation using, for example, electron beam radiation at a dosage of 10 Mrads.

It is believed that a small amount of radiation is sufficient to stabilize the desired structure and/or provide improved physical strength to the membrane composition.

The asymmetric membrane compositions of this invention are believed particularly useful in applications where a membrane composition has a dense layer at or very near one surface and a microporous support layer at the other surface. When the feed stream contacts the dense layer at one surface, undesirable concentration gradients that adversely influence the efficiency of the separation process can be minimized.

The configurations that can provide asymmetric membrane compositions include tubular devices, spiral wound devices, and hollow fiber membrane devices. A tubular device comprises a membrane discriminating layer present as a tubular film disposed on the inside or outside of a porous tube, which serves as a membrane support. A spral wound device comprises a laminar sheet consisting of a plurality of membrane lamina separated by porous feed and permeate spacers wound around a central tube. A hollow fiber membrane device is similar in configuration to a shell-and-tube heat exchanger and comprises a plurality of parallel membrane compositions in hollow fiber form embedded in at least one tube sheet. All three devices are well known in the art and are generally described in Kirk-Othmer, *Encyclopedia of Chemical Technology*, 3rd Ed., Vol. 15, pp. 108–112, 1981.

Preferred embodiments of membranes of this invention are effective in the separation of gaseous mixtures, said membranes exhibiting good permeation flux and selectivities. As the term is used herein, "good permeation selectivity" is achieved when the selectivity for oxygen to nitrogen is at least about 90 percent of the selectivity achieved by an untreated glassy polymer composition. Representative of such gaseous mixtures are those found in a wide variety of industrial exhaust streams. For example, the membranes resulting from the process of this invention can be used to markedly increase the concentration of hydrogen in mixtures of hydrogen, nitrogen, methane, argon and ammonia typically resulting from the synthesis of ammonia. In addition, the dry membranes can be used for the separation of hydrogen sulfide and carbon dioxide from natural gas, hydrogen from petrochemical process streams, oxygen from air, and hydrogen from ammonia.

The following examples are presented to further illustrate but not limit the scope of this invention. All parts and percentages are by weight unless otherwise indicated.

EXAMPLE 1

Asymmetric membrane compositions are prepared by irradiating one side of 5 inches by 5 inches square, 51 μm thick polystyrene films (sold commercially as Trycite* 1000 polystyrene film by the Dow chemical Company) using electron beam (EB) radiation (i.e., using a CB150/15/10L electrocurtain electron beam processor with 150KV accelerating voltage). Dosages of electron beam radiation for each sample is provided in Table I. During irradiation of the films a second layer of 102 μm thick polystyrene film is placed on top of the first sample. The irradiated samples (i.e., the first films) are then taken and partially crazed by immersion in n-heptane at 33.5° C. for 170 minutes. The crazed film is dried under vacuum and sectioned for observation under microscope. The thickness of the dense core layer and its position in the film is measured (as evidenced by the Asymmetric Ratio which is the ratio of the thickness of the thicker crazed layer over that of the thinner crazed layer). Data are presented in Table I.

* Trademark of the Dow Chemical Company

TABLE I

| Sample | Dosage (Mrads) | Dense Core Thickness (μm) | Asymmetric Ratio |
|--------|----------------|---------------------------|------------------|
| 1 | 0 | 5.8 | 1.20 |
| 2 | 30 | 6.9 | 1.47 |
| 3 | 60 | 9.0 | 2.21 |
| 4 | 80 | 9.2 | 2.27 |
| 5 | 120 | 11.5 | 2.30 |

TABLE I-continued

| Sample | Dosage (Mrads) | Dense Core Thickness (μm) | Asymmetric Ratio |
|---|---|---|---|
| 6 | 160 | 14.0 | 2.40 |

The data in Table I indicate that the thickness of the crazed microporous layer at the side of the composition which received the incident electron beam is thinner than that crazed layer at the other (i.e., non-irradiated) side of the film.

EXAMPLE 2

Various membrane compositions are prepared using the polystyrene film materials and the general technique described in Example 1. Film crazing conditions using n-heptane (treatment temperatures at 33.2° C.) and EB radiation dosages for each of the samples is provided in Table II. The oxygen permeation rates of each of the samples is determined at 23° C. using a Mocon Ox-Tran apparatus, which is a conventional gas permeation test apparatus. Data are presented in Table II.

TABLE II

| Sample | EB Dosage Mrads | n-Heptane Treatment Time (hours) | Nominal[1] Permeability Coefficient (× 10$^8$) | Flux[2] Ratio |
|---|---|---|---|---|
| Control* | 0 | — | 1.43 | 1 |
| 7 | 0 | 2 | 3.72 | 2.60 |
| 8 | 30 | 2 | 3.08 | 2.15 |
| 9 | 60 | 2 | 3.47 | 2.43 |
| 10 | 80 | 2 | 2.78 | 1.95 |
| 11 | 0 | 3 | 6.59 | 4.61 |
| 12 | 30 | 3 | 5.86 | 4.10 |
| 13 | 60 | 3 | 4.92 | 3.44 |
| 14 | 80 | 3 | 5.00 | 3.50 |

*Not an example of the invention. Sample is 51 μm thick sample of polystyrene film.
[1]Reported in cc · cm/cm$^2$ · sec · atm and is based on the thickness of the film before irradiation and n-heptane treatment.
[2]Flux ratio is ratio of Nominal Permeability coefficient of Sample to that of Control.

The data in Table II indicate that a substantial improvement in flux is achieved for samples of the present invention.

EXAMPLE 3

The permeation rates of oxygen and nitrogen for the Control Sample and Sample No. 11 of Example 2 are measured using a conventional gas permeation test apparatus. Both membranes exhibit a selectivity of 6.6 for oxygen over nitrogen. This indicates a substantial improvement in flux is achieved with essentially no loss of selectivity.

EXAMPLE 4

Various membrane compositions are prepared using the polystyrene film materials and the general technique described in Example 1. Film crazing conditions using n-heptane (treatment temperature is 34.2° C.) and EB radiation dosages for each sample as provided in Table III. The tensile strength of each sample is determined by testing a 1 inch by 0.25 inch sample on an Instron testing machine. Data are presented in Table III.

TABLE III

| Sample | EB Dosage (Mrads) | n-Heptane Treatment Condition (minutes) | Dense Core Thickness (μm) | Maximum[1] Tensile Strength (psi) |
|---|---|---|---|---|
| 15 | 0 | 126 | 9.2 | 3440 |
| 16 | 60 | 145 | 5.5 | 5600 |
| 17 | 80 | 145 | 9.2 | 6240 |
| 18 | 100 | 145 | 9.2 | 5740 |

[1]Cross-sectional area for determination of tensile strength is based on that of the original, untreated film.

The data in Table III indicate that EB irradiated samples exhibit higher tensile strengths than the non-irradiated sample.

EXAMPLE 5

Asymmetric membrane compositions are prepared by irradiating one side of 28 μm thick extruded films of 75 percent styrene/25 percent acrylonitrile copolymer. The film is irradiated using EB radiation as described in Example 1. Dosages of the EB radiation for each sample are provided in Table I. During irradiation of the film a layer of 102 μm thick polystyrene film is placed on top of the sample. The irradiated samples are crazed by immersion in a 15 percent acetone/85 percent n-heptane mixture at 20° C. for a period of time indicated in Table IV. The samples are dried under vacuum and microtomed for observation under a microscope. Data are presented in Table IV.

TABLE IV

| Sample | EB Dosage (Mrads) | Solvent Treatment Condition (Sec) | Dense Core Thickness (μm) | Asymmetric Ratio |
|---|---|---|---|---|
| 19 | 0 | 10 | 9.7 | 1.02 |
| 20 | 40 | 18 | 8.1 | 3.04 |
| 21 | 60 | 18 | 8.5 | 2.46 |

The data in Table IV indicate that the thickness of the crazed microporous layer on the side of the membrane composition which is irradiated with incident EB radiation is thinner than on the other (non-irradiated) side of the film.

EXAMPLE 6

The permeation rates of oxygen and nitrogen for a Control Sample and Sample No. 22 which is prepared in a manner similar to that described in Example 5 are measured using a conventional gas permeation test apparatus. Data are presented in Table V.

TABLE V

| Sample | EB Dosage (Mrads) | Solvent Treatment Condition (Sec) | Nominal Permeability Coefficient (× 10$^8$) | $\alpha^{(2)}$ | Flux[3] Ratio |
|---|---|---|---|---|---|
| Control* | 0 | — | 3.89 | 7.1 | 1.0 |
| 22 | 60 | 15 | 6.03 | 7.0 | 1.55 |

*Not an example of the invention.
[1]See footnote 1, Table II.
[2]Ratio of permeation rate of oxygen to nitrogen.
[3]See footnote 2, Table II.

The data in Table V illustrate the high flux which is achieved for the sample of the invention.

EXAMPLE 7

Asymmetric membrane compositions are prepared by irradiating one side of 51 μm thick extruded filers of rubber-modified polystyrene (sold commercially as TRYCITE* 7001 by The Dow Chemical Company). The film is irradiated using EB radiation as described in Example 1. Dosages of the EB radiation for each sample are provided in Table VI. The samples are each immersed in a solvent mixture described in Example 5 (treatment temperature at 35° C.) for 33 seconds. The samples are dried, microtomed and observed under a microscope. Data are presented in Table VI.

*Trademark of The Dow Chemical Company

TABLE VI

| Sample | Dosage (Mrads) | Dense core Thickness (μm) | Asymmetric Ratio |
|---|---|---|---|
| 23 | 0 | 9.2 | 1.00 |
| 24 | 60 | 11.0 | 1.51 |

The data in Table VI illustrate the preparation of an asymmetric membrane composition for Sample No. 24. The data also illustrate that a polymer composition having both a glassy phase and a rubber phase can be employed in order to prepare membrane compositions.

EXAMPLE 8

Asymmetric membranes are formed by coating poly(acrylic acid) onto a polystyrene film and treatment as follows. A poly(acrylic acid) (PAA) solution is prepared by dissolving 2 grams (g) of Carbopol 801 ® (B. F. Goodrich) PAA powders in 10 milliliters (ml) water. Two milliliters of the solution are added to 5 ml of DOWANOL* EE ethylene glycol ethyl ether. One milliliter of the mixed solution is spread uniformly on a 4 inches by 4 inches square TRYCITE* T-1000 2 mil thick polystyrene film. The coated film is dried in air for 24 hours. Samples cut from the film are immersed in heptane at 33.2° C. for different periods of time in order to produce solvent crazing. The samples are found to craze from the non-PAA coated surface only, as observed on microtomed cross-sections under a light microscope. The thickness of the dense skin and its position in the film are measured and are listed in Table VII.

*Trademark of The Dow Chemical Company

TABLE VII

| Sample No. | Heptane Treatment Condition Time (hours) | Skin Thickness μm | Asymmetric Ratio[1] |
|---|---|---|---|
| 1 | 2 | 36.5 | ∞ |
| 2 | 4 | 23.2 | ∞ |
| 3 | 6 | 7.5 | ∞ |
| Control** | 2 | 22.1 | 1.16 |

**Not an example of the invention.
[1]Asymmetric ratio is the ratio of the thickness of the thicker crazed layer over that of the thinner crazed layer. For a completely asymmetric membrane in which crazing occurred only from one side, the ratio is infinity (∞).

EXAMPLE 9

Asymmetric membranes are formed by coating polybutadiene onto a polystyrene film and treatment as follows. A polybutadiene solution is prepared by dissolving 20 g of polybutadiene powder in 400 ml hexane. Two milliliters of the solution are spread uniformly on a piece of 4 inches by 5 inches TRYCITE* 1000 polystyrene film of Example 8. The coated film is dried in air for 24 hours. It is then irradiated with an electron beam at 150KV and 20 Mrads dose in a CB150 Electrocurtain processor. The irradiated film is left in air for 14 days to cure the coated polybutadiene. Samples cut from the film are treated with heptane as described in Example 8. The samples are found to craze by heptane from the non-coated surface only as revealed by microtomed cross-sections under a light microscope. The thickness and the location of the dense skin in the film are measured and are listed in Table VIII.

*Trademark of the Dow Chemical Company

TABLE VIII

| Sample No. | Heptane Treatment Condition Time (hours) | Skin Thickness μm | Asymmetric Ratio |
|---|---|---|---|
| 4 | 2.0 | 35.8 | ∞ |
| 5 | 4.5 | 20.3 | ∞ |
| 6 | 6.5 | 6.7 | ∞ |

EXAMPLE 10

Asymmetric membranes are formed by coating divinylbenzene onto a polystyrene film and treatment as follows. Divinylbenzene solution is prepared by mixing 20 ml of divinylbenzene into 400 ml of DOWANOL PM* glycol ether at room temperature. A piece of 3 inches by 6 inches TRYCITE T-1000 polystyrene film having a thickness of 2 mil is folded over symmetrically into 3 inches by 3 inches square size and is then hot sealed around the open edges to form a pouch. The whole pouch is immersed into the prepared solution for 3 minutes and is dried in air for 3 hours. It is then irradiated with electron beam at 150KV and 10 Mrads dose on each side of the pouch to induce crosslinking of the coating. Thin film samples cut from the pouch are treated in heptane as described in Example 8 to induce solvent crazing. The samples are found to craze faster on the non-coated surface than the coated surface as observed under a light microscope for microtomed cross-sections. The thickness and the location of the dense layer are measured and are shown in Table IX.

*Trademark of the Dow Chemical Company

TABLE IX

| Sample No. | Heptane Treatment Condition Time (hours) | Dense Layer Thickness μm | Asymmetric Ratio |
|---|---|---|---|
| 7 | 1.2 | 32.0 | 1.14 |
| 8 | 2.37 | 17.7 | 2.08 |
| 9 | 3.2 | 5.2 | 2.12 |

EXAMPLE 11

Asymmetric membranes are prepared by coating ethylene dimethacrylate onto a polystyrene film and treatment as follows. An ethylene dimethacrylate dilute solution is prepared by mixing 2 ml of ethylene dimethacrylate into 20 ml of DOWANOL EE glycol ether at room temperature. Two ml of the solution are spread uniformly on a piece of 4 inches × 4 inches square TRYCITE T-1000 polystyrene film. The coated film is dried in air for 24 hours before it is irradiated with electron beam at 150KV and 20 Mrad dosage to cure the coating. Samples cut from the film are treated with heptane as described in Example 8 to induce solvent crazing. The samples are found to craze much faster on the non-coated surface than the coated surface as observed under a light microscope for microtomed cross-sections. The thickness and location of the dense layer are measured and are as listed in Table X.

*Trademark of The Dow Chemical Company

TABLE X

| Sample No. | Heptane Treatment Condition Time (hours) | Dense Core Layer Thickness μm | Asymmetric Ratio |
|---|---|---|---|
| 10 | 1.2 | 38.0 | ∞ |
| 11 | 2.37 | 29.9 | ∞ |
| 12 | 3.2 | 24.0 | ∞ |

EXAMPLE 12

Asymmetric membranes are prepared by coating epoxy resins onto a polystyrene film and treatment as follows. One gram of Dow DER 331 liquid epoxy resin and hardener are dissolved separately into two batches of 27 ml of DOWANOL EE* glycol ether. The prepared solutions are mixed together with 20 ml of DER* 331 solution and 10 ml of hardener solution. The solution mixture is diluted again by adding 60 ml DOWANOL EE* solution. Two milliliters of the final solution are spread uniformly on a piece of 3 inches by 3 inches square TRYCITE* T-1000 polystyrene film which is 2 mil thick. The coated film is heated in an oven at 50° C. for 26 hours to cure the epoxy coating. Samples cut from the film are treated with heptane as described in Example 8 to induce solvent crazing. The samples craze from the non-coated surface only as revealed by microtomed cross-sections under a light microscope. The thickness and the location of the dense skin are measured and are as listed in Table XI.

*Trademark of The Do Chemical Company

TABLE XI

| Sample No. | Heptane Treatment Condition Time (hours) | Dense Skin Thickness μm | Asymmetric Ratio |
|---|---|---|---|
| 13 | 2 | 36.8 | ∞ |
| 14 | 4.5 | 17.7 | ∞ |
| 15 | 6.5 | 5.2 | ∞ |

EXAMPLE 13

The oxygen and nitrogen permeability and separation factors are determined by a conventional gas permeation test apparatus. The results at 24.5° C. are shown in Table XII.

TABLE XII

| Sample[1] No. | Coating[2] Material | Treatment Condition | Nominal[3] Permeability of Oxygen cc-cm / cm$^2$ · sec · atm | $O_2/N_2$[4] α | Flux of Samples/ Flux of Control |
|---|---|---|---|---|---|
| Control** | — | — | $1.59 \times 10^{-8}$ | 6.48 | 1.00 |
| 16 | PAA | 33.2° C. - 5 hr | $6.24 \times 10^{-8}$ | 6.20 | 3.93 |
| 17 | Polybutadiene | 33.2° C. - 5 hr | $3.90 \times 10^{-8}$ | 6.51 | 2.45 |
| 18 | DVB | 33.2° C. - 3.5 hr | $1.11 \times 10^{-7}$ | 6.10 | 6.96 |
| 19 | Eth. DMA | 33.2° C. - 2.7 hr | $2.73 \times 10^{-8}$ | 6.53 | 1.72 |
| 20 | Epoxy Resin | 33.2° C. - 6.1 hr | $5.87 \times 10^{-8}$ | 6.40 | 3.69 |

**Not an example of the invention.
[1]The control sample is the untreated 2 mil thick TRYCITE* 1000 film.
[2]PAA is polyacrylic acid, DVB is divinylbenzene and Eth. DMA is ethylene dimethacrylate.
[3]The nominal permeability coefficient of oxygen is calculated based on the thickness of the film before the heptane treatment.
[4]α is the ratio of permeation of oxygen to nitrogen.
*Trademark of The Dow Chemical Company The data in Table VI indicate that a clear increase of the permeation rate is obtained. Depending upon the sample preparation method and the extent of heptane treatment, the increase of oxygen flux varies from 1.72 times to about 7 times while the same oxygen selectivity of about 6.5 over nitrogen is maintained.

EXAMPLE 14

Asymmetric membranes are prepared by surface sulfonation of polystyrene films and crazing as follows. Sulfur trioxide dilute solution is prepared by mixing 22 milliliters (ml) of sulfur trioxide into 405 ml Freon 113 (sold commercially by E. I. duPont de Nemours and Company) at room temperature. Rectangular pieces of 50 μm thick polystyrene film (sold commercially as TRYCITE* 1000 polystyrene film by The Dow Chemical Company) having a size of 3 inches by 6 inches are folded over symmetrically into 3 inches by 3 inches size and are hot sealed around the open edges to form film pouches. These pouches are then immersed into the prepared solution for different periods of time and are rinsed in Freon 113 solution afterwards. The treated pouches are subsequently dried in vacuum for at least 3 hours. Thin film samples cut from the pouches are immersed in heptane at 35.4° C. to produce solvent crazing. Samples are found to craze from the non-sulfonated surface only as observed on microtomed cross-sections under a light microscope. Measurements of the dense skin layer thickness as a function of the heptane treatment time indicate that the dense layer thickness decreased linearly at the beginning and then leveled off to a limiting thickness. The thickness of the dense skin varies with the extent of sulfonation. The results of the measurements are listed in Table XIII.

TABLE XIII

| Sample No. | Sulfonation Time (minutes) | Heptane Treatment Condition Time (minutes) | Dense Skin Thickness (μm) | Asymmetric[1] Ratio |
|---|---|---|---|---|
| 1* | 0 | 170 | 5.8 | 1.15 |
| 2 | 5 | 117 | 18.4 | ∞ |
| 3 | 5 | 169 | 4.8 | ∞ |
| 4 | 5 | 210 | 3.5 | ∞ |
| 5 | 10 | 155 | 9.2 | ∞ |
| 6 | 10 | 186 | 3.2 | ∞ |
| 7 | 10 | 225 | 2.0 | ∞ |
| 8 | 20 | 150 | 10.8 | ∞ |
| 9 | 20 | 192 | 7.4 | ∞ |
| 10 | 20 | 236 | 3.4 | ∞ |
| 11 | 30 | 180 | 15.0 | ∞ |
| 12 | 30 | 210 | 13.8 | ∞ |

TABLE XIII-continued

| Sample No. | Sulfonation Time (minutes) | Heptane Treatment Condition Time (minutes) | Dense Skin Thickness (μm) | Asymmetric[1] Ratio |
| --- | --- | --- | --- | --- |
| 13 | 30 | 246 | 13.3 | ∞ |

*Not an example of the invention. Heptane treatment temperature is 33.5° C. for Sample No. 1 only.
[1]Asymmetric ratio is the ratio of the thickness of the thicker crazed layer over that of the thinner crazed layer. For a complete asymmetric membrane in which crazing occurred only from one side, the ratio is infinity (∞)

EXAMPLE 15

Asymmetric membranes are prepared by surface bromination of polystyrene films and crazing as follows. Saturated bromine solution was prepared by mixing 3 ml bromine into 250 ml deionized water at room temperature. Pieces of polystyrene as described in Example 14 are folded over symmetrically into 3 inches by 3 inches size and are hot sealed around the open edges to form pouches. These pouches are then immersed into the prepared solution for different periods of time. They are rinsed in water and are subsequently dried in vacuum for 24 hours. Thin film samples cut from the pouches are immersed in heptane at 35.4° C. to produce solvent crazing in the films. The samples are found to craze much slower on the brominated surface than the non-brominated surface as observed on microtomed cross-sections under a light microscope. The thickness and the location of the dense layer varies with the extent of bromination under the same heptane treatment condition. The results of the measurements are listed in Table XIV.

TABLE XIV

| Sample No. | Bromination Time (Hours) | Heptane Treatment Condition Time (Minutes) | Dense Layer Thickness (μm) | Asymmetric Ratio |
| --- | --- | --- | --- | --- |
| 14 | 1 | 49 | 35.0 | 4.8 |
| 15 | 1 | 94 | 16.1 | 4.5 |
| 16 | 1 | 120 | 10.5 | 3.7 |
| 17 | 2 | 100 | 26.0 | ∞ |
| 18 | 2 | 140 | 21.5 | ∞ |
| 19 | 2.5 | 100 | 30.2 | ∞ |
| 20 | 2.5 | 140 | 24.5 | ∞ |
| 21 | 3 | 100 | 45.5 | ∞ |
| 22 | 3 | 140 | 41.5 | ∞ |

EXAMPLE 16

Asymmetric membranes are prepared by surface sulfonation of styrene-acrylonitrile films and crazing as follows. Sulfur trioxide dilute solution is prepared as described in Example 14. Pieces of 3 inches by 6 inches extruded SAN (styrene-acrylonitrile copolymer) containing 76 percent styrene and 24 percent acrylonitrile films of 1.1 mil thickness are folded over symmetrically into 3 inches by 3 inches size and are hot sealed around the open edges to form film pouches. They are immersed into the prepared solution for different periods of time, rinsed in Freon 113 solution afterwards, and are subsequently dried in vacuum for 3 hours. Thin film samples cut from the pouches are immersed in a 15 percent acetone/85 percent heptane mixture at 23.8° C. for 40 to 45 seconds to produce solvent crazing. Non-sulfonated SAN films usually craze through after 30 seconds in the same solvent mixture. Samples are found to craze from the non-sulfonated surface only as observed on microtomed cross-sections under a light microscope. The dense skin layer thickness increased with the sulfonation time. The results of the measurements are listed in Table XV.

TABLE XV

| Sample No. | Sulfonation Time (Minutes) | 15% Acetone/ 85% Heptane Mixture Treatment Condition Time (seconds) | Dense Skin Layer Thickness (μm) | Asymmetric Ratio |
| --- | --- | --- | --- | --- |
| 23 | 1 | 40 | 9.2 | ∞ |
| 24 | 2 | 40 | 10.5 | ∞ |
| 25 | 5 | 40 | 15.6 | ∞ |
| 26 | 10 | 45 | 17.6 | ∞ |

EXAMPLE 17

Various membrane compositions are prepared using the polystyrene film materials and general techniques described in Examples 14 and 15. Film crazing conditions using n-heptane (treatment temperatures 33.2° C.) are presented in Table IV. The oxygen permeation rates of each of the samples is determined at 25° C. using a constant volume variable pressure gas permeation test apparatus. Data are presented in Table XVI.

TABLE XVI

| Sample | Surface Treatment Condition Process | Surface Treatment Condition Time (min.) | Heptane Crazing Condition (minutes) | Nominal[1] $O_2$ Permeability Coefficient ($\times 10^8$) | $\alpha^{(3)}$ $O_2/N_2$ | Flux[2] Ratio |
| --- | --- | --- | --- | --- | --- | --- |
| 27 | sulfonation | 2 | 290 | 4.07 | 5.35 | 2.56 |
| 28 | sulfonation | 5 | 323 | 4.02 | 6.10 | 2.55 |
| 29 | bromination | 128 | 360 | 2.04 | 5.40 | 1.28 |
| C-1* | — | — | — | 1.59 | 6.48 | 1 |

*Not an example of the invention (untreated polystyrene film).
[1]Reported in cc · cm/cm$^2$ · sec · atm and is based on the thickness of the film before irradiation and n-heptane treatment.
[2]Flux ratio is ratio of nominal permeability coefficient of sample to that of control.
[3]$\alpha$ is ratio of permeation rate of oxygen to nitrogen.

What is claimed is:

1. A process for preparing an asymmetric membrane having at least one dense layer comprising the steps of
   (a) selectively treating a major surface of a nonporous, glassy polymer composition to render the surface resistant to solvent crazing; and then
   (b) contacting the glassy polymer composition with a solvent so as to craze at least a portion of the composition and thereby provide at least one microporous layer and to leave at least one dense layer.

2. The process recited in claim 1 wherein the surface of the glassy polymer composition is treated in step (a) by crosslinking.

3. The process recited in claim 1 wherein the surface of the glassy polymer composition is treated in step (a)

with an agent which prevents the crazing solvent from directly contacting the surface of the composition.

4. The process recited in claim 1 wherein the surface of the glassy polymer composition is treated in step (a) with an agent that exhibits a high flux for components to which the polymer is permeable, yet is capable of protecting the treated surface of the composition from attack by the crazing solvent.

5. The process recited in claim 1 wherein the surface of the glassy polymer composition is treated in step (a) with an agent which is capable of diffusing into the composition to a limited depth to render the surface layer resistant to solvent crazing.

6. The process recited in claim 1 wherein the surface of the glassy polymer composition is treated in step (a) with an agent which reacts with the surface thereby imparting a polar character to the surface.

7. The process recited in claim 2 wherein the crosslinking is provided by irradiation.

8. The process recited in claim 3 wherein the glassy polymer composition is crosslinked to a degree effective to increase the physical strength of the asymmetric membrane.

9. The process recited in claim 4 wherein the glassy polymer composition is crosslinked to a degree effective to increase the physical strength of the asymmetric membrane.

10. The process recited in claim 5 wherein the glassy polymer composition is crosslinked to a degree effective to increase the physical strength of the asymmetric membrane.

11. The process recited in claim 6 wherein the glassy polymer composition is crosslinked to a degree effective to increase the physical strength of the asymmetric membrane.

12. The process recited in claim 1 wherein the dense layer ranges up to about 50 percent of the total thickness of the asymmetric membrane.

13. The process of claim 1 wherein the dense layer is a continuous layer in close proximity to a first major surface of the membrane, which was rendered resistant to crazing in step (a).

14. The process of claim 1 wherein the crazing solvent is selected from the group consisting of aliphatic hydrocarbons, the halocarbons, the aliphatic ethers and carbonyl-containing solvents.

15. The process of claim 1 wherein the glassy polymer composition is selected from the group consisting of polystyrene, acrylonitrile, butadiene styrene resins, styrene-acrylonitrile copolymers and styrene acrylic acid copolymers.

16. The process of claim 1 wherein the membrane achieves at least a twofold increase in permeation flux relative to the flux achieved by the glassy polymer composition prior to treatment, while maintaining a selectivity for oxygen to nitrogen of at least 90 percent of the selectivity achieved by the glassy polymer composition prior to treatment.

17. An asymmetric membrane made from a glassy polymer composition by the process of claim 1, which comprises at least one dense layer at a first major surface of the membrane, which was rendered resistant to crazing in step (a), and at least one microporous layer at a second major surface of the membrane.

18. The asymmetric membrane recited in claim 17 wherein the glassy polymer composition is crosslinked to a degree effective to increase the physical strength of the asymmetric membrane.

19. The asymmetric membrane recited in claim 17 wherein the dense layer ranges up to about 50 percent of the total thickness of the untreated glassy polymer composition.

20. The asymmetric membrane recited in claim 17 wherein the dense layer is in the form of a continuous layer.

21. The asymmetric membrane recited in claim 17 wherein the glassy polymer composition is selected from the group consisting of a polystyrene, an acrylonitrile, a butadiene-styrene resin, a styrene-acrylonitrile copolymer and a styrene-acrylic acid copolymer.

22. The asymmetric membrane recited in claim 17 wherein the dense layer has a thickness ranging from 0.1 $\mu$m to about 25 $\mu$m.

23. The asymmetric membrane recited in claim 17 wherein the glassy polymer composition has a thickness ranging from 5 $\mu$m to about 100 $\mu$m.

24. The asymmetric membrane recited in claim 17 wherein the membrane achieves at least a twofold increase in permeation flux relative to the flux achieved by the glassy polymer composition prior to crazing, while maintaining a selectivity for oxygen to nitrogen of at least 90 percent of the selectivity achieved by the glassy polymer composition prior to treatment.

25. The process recited in claim 3 further comprising removing the agent from the asymmetric membrane after the desired crazing is complete.

26. The process recited in claim 6 wherein the glassy polymer composition is selected from the group consisting of a polystyrene, a styrene-acrylonitrile copolymer, a polycarbonate, a polysulfone, and a polyether sulfone and the agent is sulfur trioxide.

* * * * *